March 26, 1940.  H. G. SMITH  2,195,040
MEASURING INSTRUMENT
Filed March 9, 1938  2 Sheets-Sheet 1

INVENTOR
HALE G. SMITH
BY
Frederick P. Worfield
ATTORNEY

March 26, 1940.   H. G. SMITH   2,195,040
MEASURING INSTRUMENT
Filed March 9, 1938   2 Sheets-Sheet 2
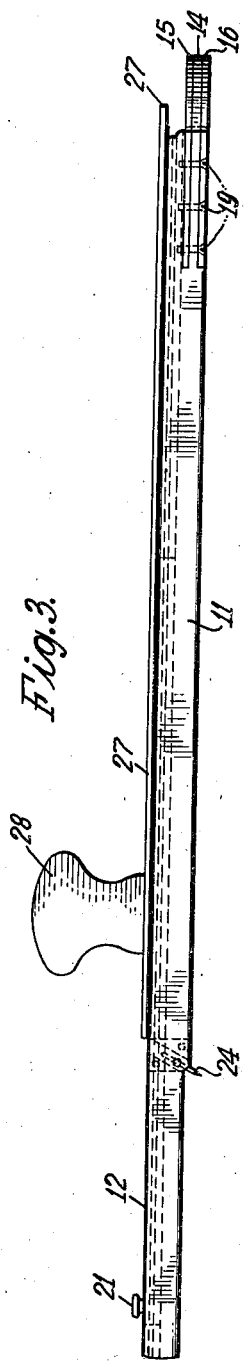
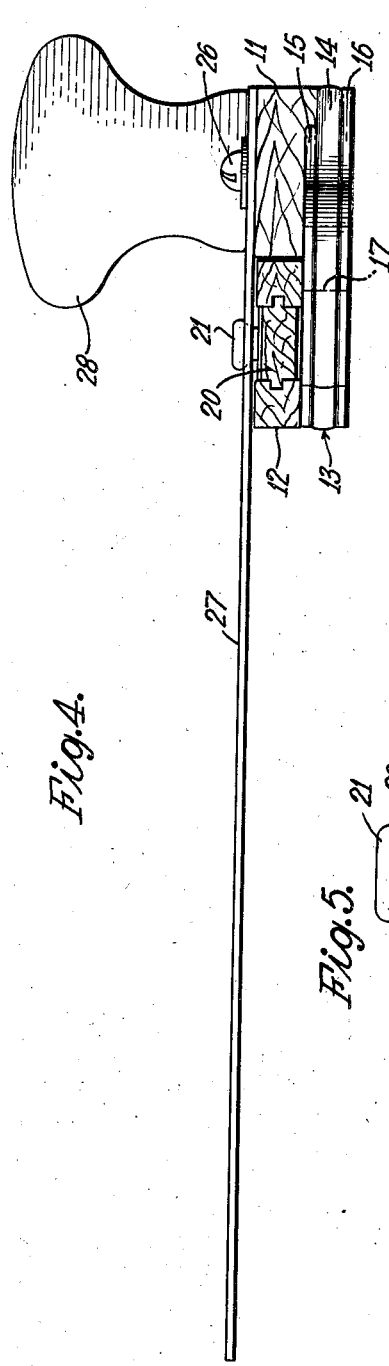
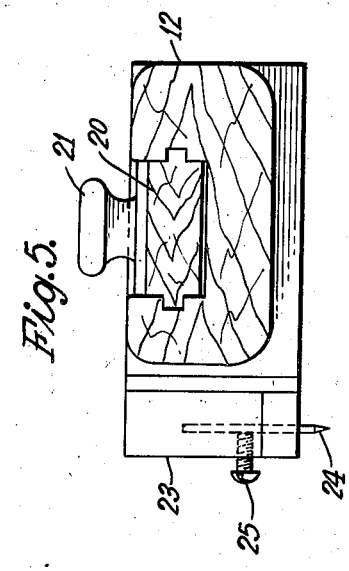
INVENTOR
HALE G. SMITH
BY
ATTORNEY Patented Mar. 26, 1940

2,195,040

UNITED STATES PATENT OFFICE 2,195,040

MEASURING INSTRUMENT

Hale G. Smith, Beechhurst, N. Y., assignor to Aerial Explorations, Inc., Long Island City, N. Y., a corporation of New Jersey Application March 9, 1938, Serial No. 194,752

6 Claims. (Cl. 33—150)

This invention relates to measuring instruments and more particularly to instruments for computing the ratio between distances on an area, such as a map or on a photograph.

The main object of this invention is to provide a simple instrument for computing directly the ratios between given linear distances.

Another object is to provide an instrument of the above type which will measure the ratio of the distances between pairs of points appearing on both of two overlapping photographs.

A further object is to provide an instrument for the above purpose which will read directly in numerical ratios, thus obviating the necessity of direct unitary measurements.

A still further object is to provide an instrument of the above type which can be utilized to lay off a distance of any desired ratio to a given distance.

Other objects and advantages will in part be obvious and will in part appear from what follows.

One embodiment of the invention will now be described as a non-limiting example in connection with the accompanying drawings, in which—

Fig. 3 is a side elevation of the other side from that shown in Fig. 2,

Fig. 4 is an enlarged end view from the hinge end.

Fig. 5 is an enlarged detail view of the slide-containing member of the instrument.

Figure 1:
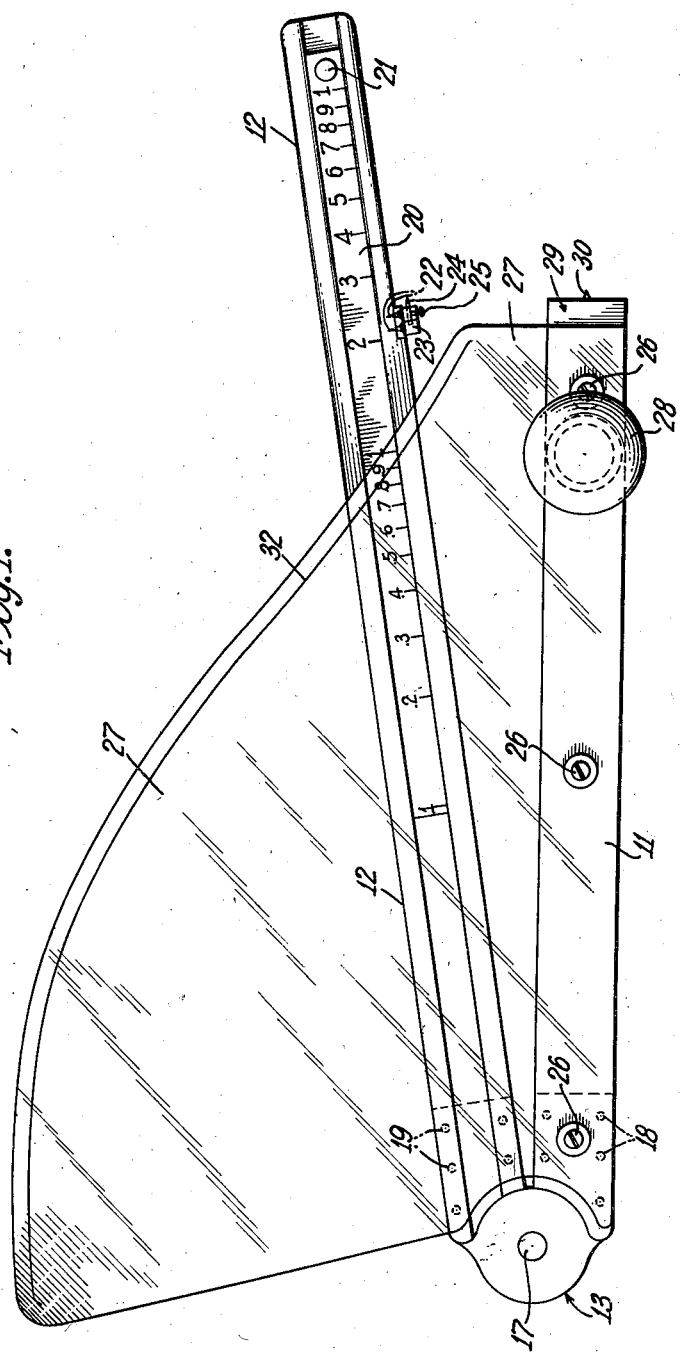
Fig. 1 is a top plan view of an instrument built according to this invention.
Figure 2:
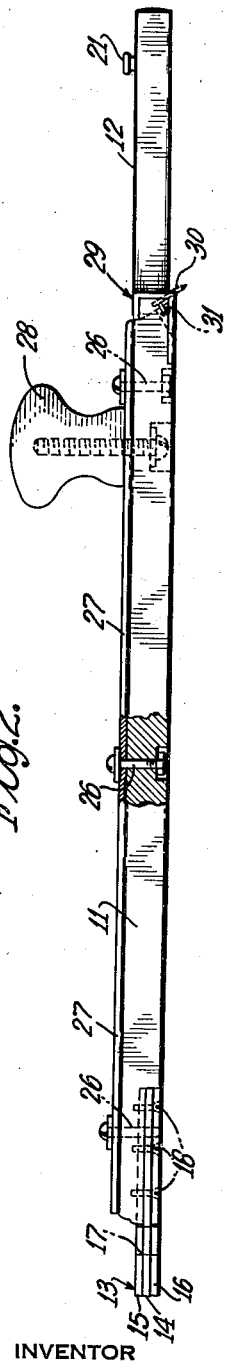
Fig. 2 is a side elevation of the instrument shown in Fig. 1.

The instrument of the invention comprises basically the two arms or legs 11 and 12 pivotally hinged together at 13 as shown. These arms are shown of wood, but obviously their material is no part of the invention and may be altered at will. The particular type of hinge shown in the drawings is not essential but it is useful in that it enables the two arms to be closed until they are parallel. This hinge comprises a central portion 14 mounted between top and bottom sections 15 and 16 and pivotally secured together by stud 17. It is secured to arms 11 and 12 as shown by means such as screws 18 and 19. Within arm 12 is slidably mounted member 20 bearing thereon a logarithmic scale as shown in Fig. 1. Obviously this scale will be calibrated in more detail than is shown in the drawings and it will be observed that it is graduated from .1 near its inner end to 10 at its outer end, with its index, "1", approximately in the middle. Slide 20 is preferably provided with a handle knob 21, and though shown of wood may be of metal or any other suitable material. The end portion of arm 12 is preferably beveled as shown in Fig. 5 to facilitate handling of the instrument. On the side of arm 12 is mounted by means of screws 22 a bracket 23 in which may be mounted a pointer 24 by means of set screw 25. Obviously any other type of pointer and mounting may be used equally well, but the removable pointer shown which may, for instance, be a needle such as is used on a phonograph, is very useful in that it may be changed at will, thus making a sharp pointer always available and facilitating accuracy.

On arm 11 is mounted by means of bolts and nuts 26 a sheet 27 of Celluloid or similar transparent material. Arm 11 is preferably provided with a handle knob 28 and carries at its end a mounting 29 for a pointer 30 held by set screw 31. Pointers 24 and 30 are positioned equidistant from pivot stud 17. On Celluloid sheet 27 there is a gauge line 32. The manner of calibrating the curve of gauge line 32 will be explained below.

The manner of use of this device is as follows:

Suppose for the sake of simplicity it is desired to know the ratio between two straight line distances on a map. Arms 11 and 12 are adjusted until pointers 24 and 30 rest upon the opposite ends of one line. Slide 20 is then moved until its index "1" coincides with gauge line 32. The instrument is then shifted and the pointers placed on the ends of the other distance to be measured, slide 20 remaining in its then position. The point on the logarithmic scale at which gauge line 32 crosses will be the numerical ratio of the first distance to the second distance. This value may conveniently be termed the ratio factor of the two distances, as this term is used in the claims.

This instrument can also be used to lay off a distance of any desired ratio to a given distance. For example, assume that it is desired to lay off a distance twice the length of a given distance "xy." The pointers are set on "x" and "y" and slide 20 placed so "2" coincides with the gauge line. The arms are then widened until the index of the slide coincides with the gauge line. The distance then between the pointers will be the distance desired.

It appears that the curve of gauge line 32 must preferably be first computed mechanically and engraved upon a templet. To do this, slide 20 is first reversed and fixed so that the index thereon will correspond with a point chosen to lie along gauge line 32 and near the end thereof nearest pointer 30. Pointers 24 and 30 are then fixed an arbitrary distance apart, which is preferably the same as the distance from the index to "2" on slide 20, and a prick is made on the Celluloid corresponding to the position of the index. Note, however, that since slide 20 has been reversed the prick must correspond with the position of the index in normal reading position, and so must be made on the side of the scale opposite the reversed position of the index. This procedure must be followed throughout the calibration process. For the sake of convenience, assume the distance from the index to "2" to be one inch. The pointers are then set 1.1 inches apart and a prick made on the Celluloid corresponding to position of "1.1" on the slide. The pointers are then moved to 1.2 inches, a prick made corresponding to "1.2" on the slide. This procedure is continued until enough points are mechanically put on the Celluloid to indicate the proper curve for the gauge line, and the points are then connected by a continuous line to form the finished gauge line. Other methods may be followed for plotting this curve, but the procedure given above is preferable, in that it will result in a curve which will in any position cross slide 20 at an angle close to 45° and thus render reading easier and more accurate. Once a master gauge line 32 has been plotted, it may be transferred to a templet and copied any number of times. For greater ease and accuracy of reading, line 32 should be on the under side of sheet 27.

One of the fields of usefulness for the device of this invention is in the mosaicing of overlapping aerial photographs for the platting of maps therefrom, the so-called art of photogrammetry. In doing this work, the ratio of each photograph in a series to those overlapping it may be quickly and accurately determined by computing with the device of this invention the ratios one to another of the distances between pairs of points both of which appear on each of overlapping photographs. Thus if points "x" and "y" both appear in each of a pair of overlapping photographs the ratio of the one photograph to the other may quickly be determined by computing by means of this invention the ratio between the distance xy in one photograph to the distance xy in the other. Once this fact is known the two photographs may be enlarged varying degrees to form a composite negative on which each point appears in its proper relation to each other point.

Since certain changes in carrying out the above methods, and certain modifications in the article which embody the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described my invention, what I claim as new and desire to secure by Letters Patent is:

1. A measuring instrument comprising in combination, a pair of arms pivotally joined to each other at one end, a scale slidably mounted on one of said arms longitudinally thereof and parallel therewith, and a gauge line carried by the other of said arms and adapted to register with said scale.

2. A measuring instrument comprising in combination, a pair of arms pivotally joined to each other at one end, pointed means on each of said arms, a scale slidably mounted on one of said arms longitudinally thereof and parallel therewith, and a gauge line carried by the other of said arms and adapted to register with said scale for computing the ratio of the distance between said pointer means in any initial position to the distance between said pointer means in any other position.

3. A measuring instrument comprising in combination, a pair of arms pivotally joined to each other at one end, a logarithmic scale slidably mounted on one of said arms longitudinally thereof and parallel therewith, and a gauge line carried by the other of said arms and adapted to register with said scale.

4. A measuring instrument comprising in combination, a pair of arms pivotally joined to each other at one end, pointer means on each of said arms, a scale slidably mounted on one of said arms longitudinally thereof and parallel therewith, a plate member carried by the other of said arms, and a gauge line carried by said plate and adapted to register with said scale.

5. A measuring instrument comprising in combination, a pair of arms pivotally joined to each other at one end, pointer means on each of said arms equidistant from said pivot, a scale slidably mounted on one of said arms longitudinally thereof and parallel therewith, a plate member carried by the other of said arms, and a gauge line carried by said plate and adapted to register with said scale for computing the ratio of the distance between said pointer means in any initial position to the distance between said pointer means in any other position.

6. A measuring instrument comprising in combination, a pair of arms pivotally joined to each other at one end, pointer means on each of said arms equidistant from said pivot, a scale slidably mounted on one of said arms longitudinally thereof and parallel therewith, a plate member carried by the other of said arms, and a gauge line carried by said plate and adapted to register with said scale for automatically computing logarithmically the ratio of the distance between said pointer means in any initial position to the distance between said pointer means in any other position.

HALE G. SMITH.